Aug. 17, 1954  G. A. WHITEHURST ET AL  2,686,645
STORAGE PLATFORM
Filed June 25, 1949  3 Sheets-Sheet 1
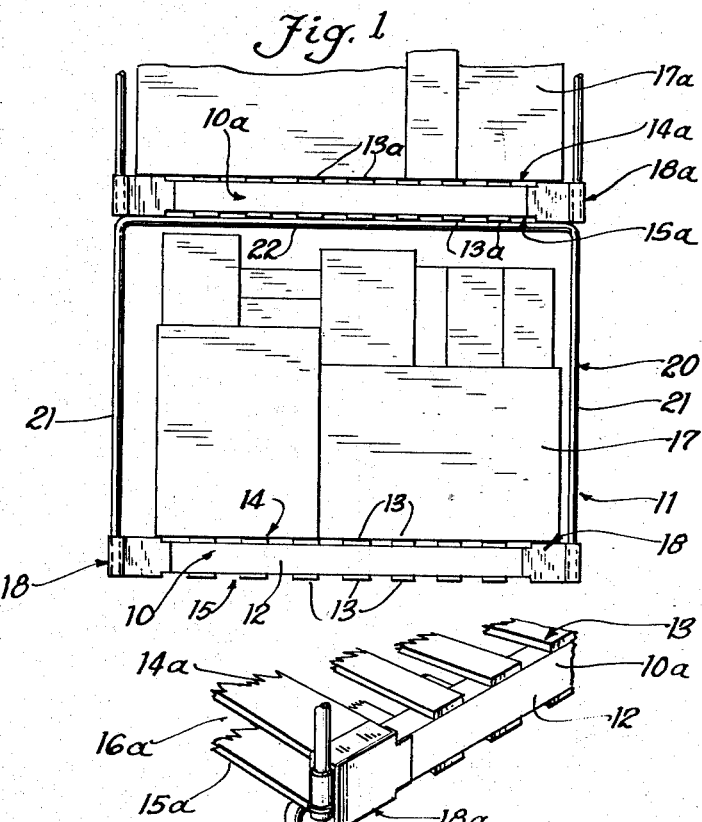
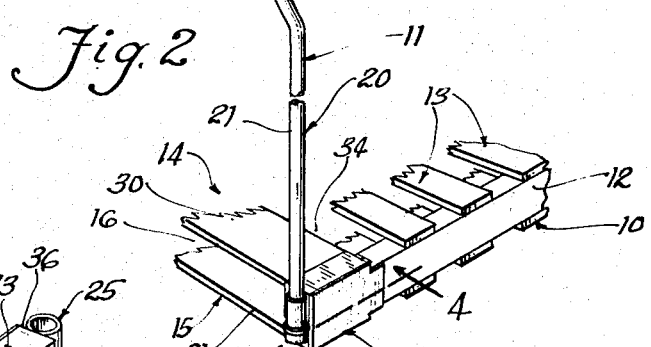
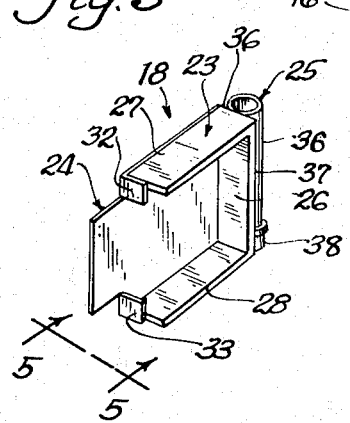
INVENTORS.
George A. Whitehurst
& Frederick W. Bond, Jr.
BY
Thiess, Olson & Mecklenburger
Att'ys

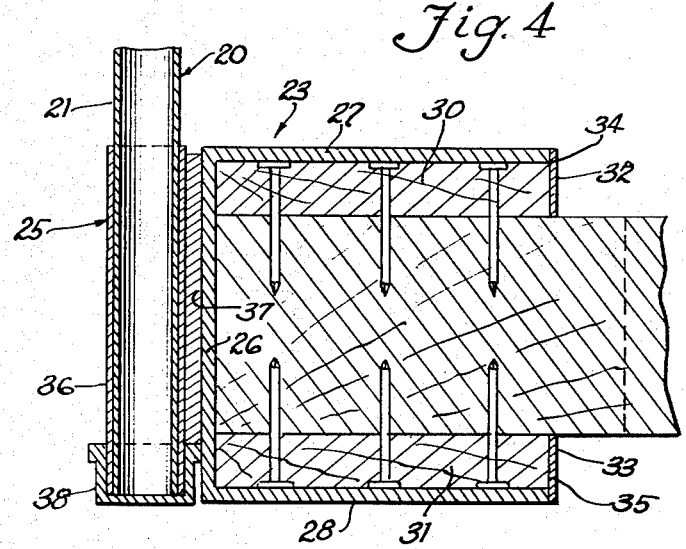
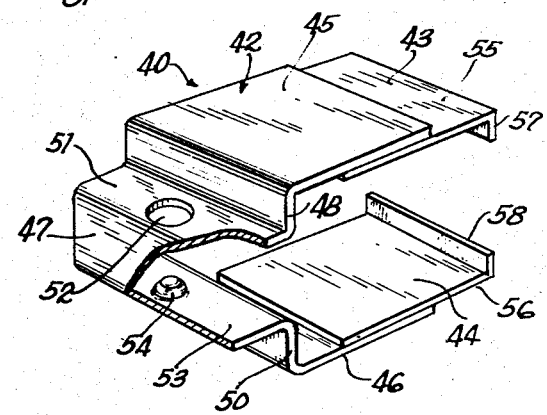
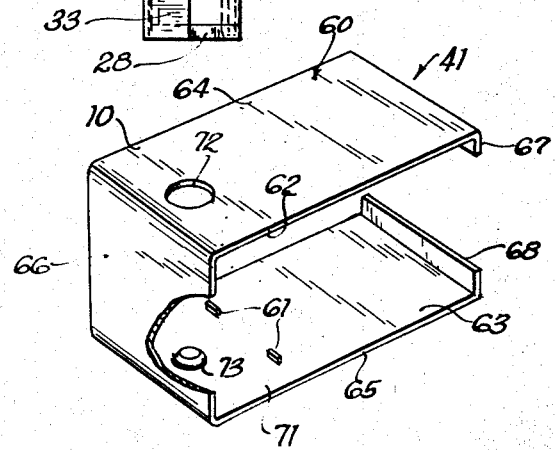

Aug. 17, 1954     G. A. WHITEHURST ET AL     2,686,645
STORAGE PLATFORM
Filed June 25, 1949     3 Sheets—Sheet 3
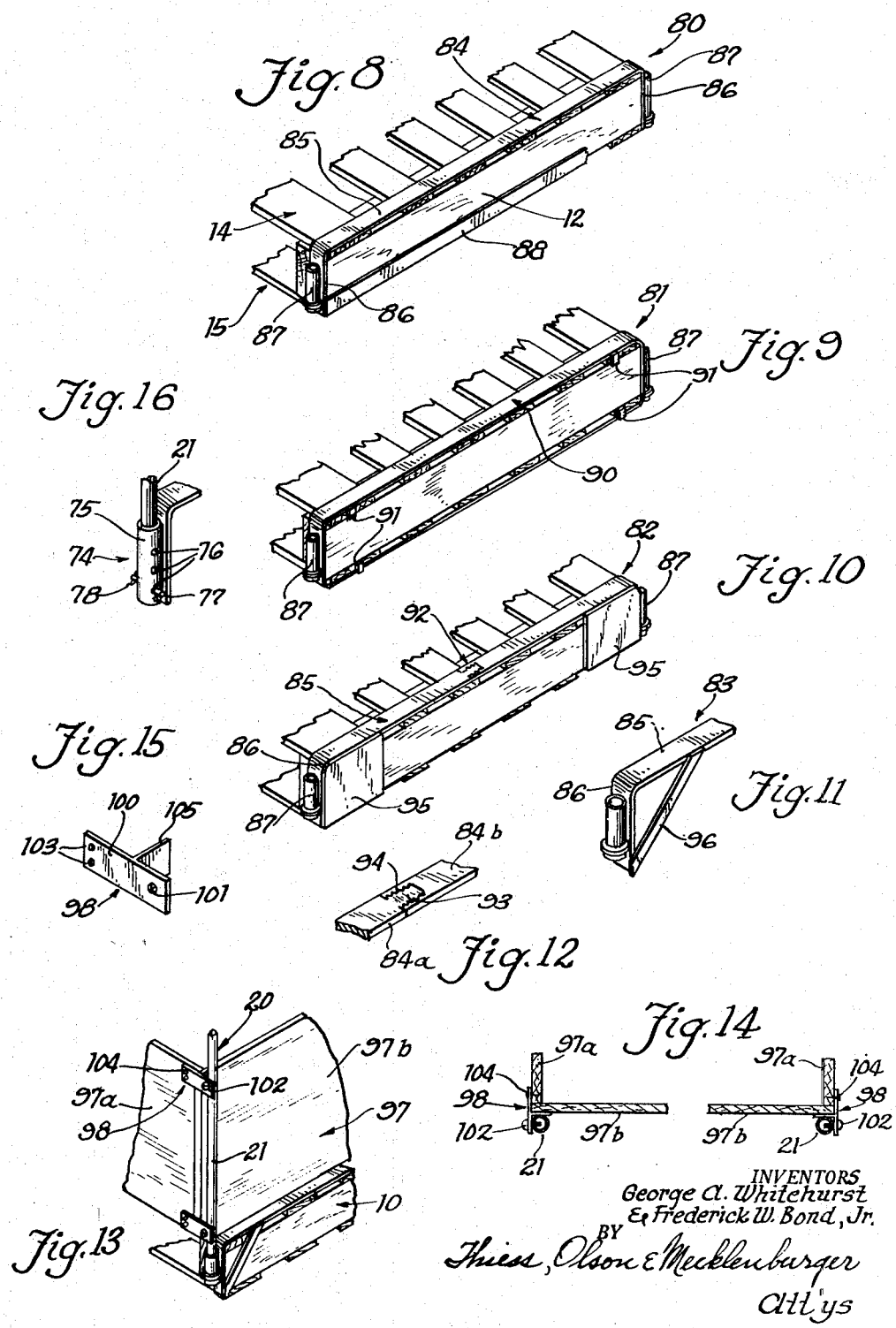
INVENTORS
George A. Whitehurst
& Frederick W. Bond, Jr.
BY Thiess, Olson & Mecklenburger
Att'ys Patented Aug. 17, 1954

2,686,645

UNITED STATES PATENT OFFICE 2,686,645

STORAGE PLATFORM

George A. Whitehurst, Wilmette, and Frederick W. Bond, Jr., Chicago, Ill., assignors to Montgomery Ward & Co., Incorporated, Chicago, Ill., a corporation of Illinois Application June 25, 1949, Serial No. 101,388

5 Claims. (Cl. 248—120)

This invention relates to an auxiliary supporting device for use in combination with a plurality of loaded storage pallets when stacking the pallets, in a spaced relationship, one above the other.

Storage pallets or platform skids have been used for many years in manufacturing and warehouse establishments for conveying and storing various materials or goods thereon. The pallets are generally formed of wood and are boxlike in constructoin, consisting of a pair of parallel stout end pieces to which are transversely fastened, in spaced relationship, parallel slats or planks. The topside and underside of the pallet are formed of these slats and two of the opposite sides of the pallet are left open so that a forked arm mounted on the front end of a power-driven elevating truck may be inserted between the slatted sides and the pallet raised and conveyed to any desired location by the truck.

To utilize the floor space of the establishment to the fullest extent, it is customary to stack loaded pallets one above the other, whereby the upper pallet rests directly on and is supported by the material or goods loaded on the pallet positioned therebeneath. However, when the pallets are loaded with crushable or breakable material, or materials which are of an irregular size and shape and are not adapted to form regular piles, this practice of stacking the pallets, as above described, cannot be followed.

Thus, it is one of the objects of this invention to provide an auxiliary supporting device for storage pallets which will enable a plurality of loaded pallets to be stacked one above the other without the loaded material bearing the weight of the pallet positioned thereabove.

It is a further object of this invention to provide auxiliary supporting devices for storage pallets which are detachably mounted along the opposite sides of the pallets.

It is a further object of this invention to provide auxiliary supporting devices for storage pallets which merely clip on the sides of the pallet and do not require further means, such as nails and the like, for retaining the devices in their operative position.

An additional object is to provide a supporting device for storage pallets which may readily be removed from the pallet and disassembled for storage when not in use.

A still further object is to provide a supporting device for storage pallets which is simple, yet sturdy in construction, effective in operation, and inexpensive to produce.

Further and additional objects will appear from the description, accompanying drawings, and appended claims.

In accordance with one embodiment of this invention, a supporting device for storage pallets is provided for use when stacking pallets, loaded with crushable material, or material of irregular size and shape, one above the other. The device comprises a plurality of seating brackets or base members detachably mounted on the opposite edge portions of one of said pallets, and a plurality of rack members mounted on said brackets and extending vertically therefrom, and engaging the underside of a second pallet positioned thereabove. The rack members provide supporting ledges for the pallet positioned thereabove.

For a more complete understanding of this invention, reference should now be made to the drawings, wherein Fig. 1 is a fragmentary end view of a plurality of loaded pallets shown in a stacked arrangement.

Fig. 2 is a fragmentary perspective view of the supporting device shown operatively mounted.

Fig. 3 is a fragmentary perspective view of the seating bracket shown in Figs. 1 and 2.

Fig. 4 is a fragmentary sectional view of the device taken along line 4—4 of Fig. 2.

Fig. 5 is an end elevational view of the seating bracket taken along line 5—5 of Fig. 3.

Fig. 6 is a perspective view of a modified form of seating bracket.

Fig. 7 is a perspective view of another modified form of seating bracket.

Fig. 8 is a fragmentary perspective view of an end of a pallet showing a modified form of seating bracket mounted thereon.

Fig. 9 is like Fig. 8 showing another modified form of seating bracket.

Fig. 10 is like Fig. 8 showing another modified form of seating bracket.

Fig. 11 is a fragmentary perspective view of a modified form of seating bracket.

Fig. 12 is a fragmentary perspective view of the spliced section of the supporting strap for the seating bracket shown in Fig. 10.

Fig. 13 is a fragmentary perspective view of a corner of a pallet having attachments mounted thereon for converting said pallet into a boxlike container.

Fig. 14 is a fragmentary, horizontal sectional view of the pallet shown in Fig. 13.

Fig. 15 is a perspective view of the holding bracket used in conjunction with the pallet shown in Fig. 13.

Fig. 16 is a modified form of socket member for the seating bracket.

Referring now to the drawings and, more particularly, to Fig. 1, a plurality of loaded storage pallets or platform skids 10 and 10a are shown in a stacked, vertically-spaced position. The upper pallet 10a, it is to be noted, rests wholly on a supporting device 11 which is detachably mounted on the lower pallet 10 and will be described more fully later.

The pallets 10 and 10a, in this instance, are of the so-called dead type and of conventional design, and preferably of wood construction, comprising a pair of stout end pieces 12 and a plurality of narrow, elongated slats or planks 13. The slats 13 are positioned transverse to the end pieces 12 and in a parallel, spaced relationship to one another, and the ends thereof are fastened to opposite faces of the end pieces, thus forming the top and undersides 14 and 15, respectively, of the pallet. Two opposite sides 16 and 16a of the pallets 10 and 10a, respectively, are open so as to enable a forked member, not shown, mounted on the front side of a power-driven, elevating truck to be inserted through the open sides 16 or 16a and between the top and undersides 14 and 15 or 14a and 15a to thereafter hoist and convey the loaded pallet or pallets to any desired location.

In order to utilize the floor space of the warehouse or plant to the fullest extent, it has become the practice to arrange the pallets in a stacked position whereby the upper pallet is supported by the material loaded on the pallet positioned therebeneath. When the pallets are loaded with crushable materials 17 and 17a, or materials of irregular size and shape such as rakes, hose, etc., not shown, which are not adapted to form regular or uniform piles, this practice cannot be followed. The supporting device 11, as mentioned above, supports the upper pallet 10a free and clear from the material 17 loaded on pallet 10.

The device 11 comprises two pairs of seating brackets 18, one pair detachably mounted on opposite sides of pallet 10, and two rack members 20, one for each pair of seating brackets 18. The rack members 20 are of substantially U-shaped design and, when operatively positioned on the pallet, are inverted as shown in Figs. 1 and 2. The legs 21 of the rack members 20, which extend vertically from the corresponding seating brackets 18, are of sufficient length so that the underside 15a of pallet 10a will be spaced from the top of the loaded material 17. The web or base portion 22 of the rack member 20, which connects or is integral with the legs 21, is of substantially the same length as the end piece 12. The web portion 22 is horizontally disposed and provides the supporting ledge for pallet 10a. The web portion 22 is offset slightly from the plane formed by the legs 21 and, when operatively positioned, engages the underside 15a of pallet 10a at a point spaced inwardly from the ends of the pallets. The offsetting of web portion 22 enables the seating brackets 18a to be mounted on or removed from the pallet 10a without interference. Rack members 20, in this instance, are shown to be constructed of hollow tubelike material; however, their construction is not to be limited to this particular material.

The preferred form of seating bracket 18 is shown in Figs. 1–5 and comprises a U-shaped clip member 23, a plate 24 secured to one side of said clip member, and a socket member 25 vertically mounted on the web portion 26 of the clip member. The clip member 23, which is preferably formed of relatively thick gauge strip metal, embraces the corner of the pallet in such fashion that the flange portions 27 and 28 of the clip member extend longitudinally of the end pieces 12 and engage the topside 14 and underside 15, respectively, of the pallet. The length of the flange portions 27 and 28 is substantially the same as the width of the adjacent slats 30 and 31 respectively. The plate 24, which is mounted on one side of clip member 23 by welding or any other suitable means, is preferably formed of relatively thin gauge sheet metal. The plate 24 serves two purposes, namely, to prevent spreading of the flange portions 27 and 28 when the bracket is under load, and to act as a stop for the brackets and prevent the clip from slipping inwardly from the ends of the pallet. Two fingers 32 and 33 are struck out at a right angle from the end of the plate 24 and are secured to the end of flanges 27 and 28, respectively, of clip member 23. The fingers 32 and 33 engage the inside edges 34 and 35 of the slats 30 and 31, respectively, and thus prevent the clip member from slipping endwise of the end piece 12 and off the pallet.

The socket 25 comprises a cylindrical sleeve 36, rigidly mounted in a longitudinal direction on the outside surface 37 of web portion 26 of clip member 23, and a bearing cap 38 mounted on and closing the lower end of sleeve 36 and which is likewise rigidly mounted on surface 37. The sleeve 36, when the bracket is operatively positioned on the pallet, is vertically extending and the end of the corresponding leg 21 of rack member 20 is seated therein and rests on bearing cap 38, as shown in Fig. 4.

A modified form of socket 74 is shown in Fig. 16 which comprises a cylindrical sleeve 75, similarly mounted as sleeve 36, having a plurality of diametrically opposed, longitudinally spaced openings 76, and a supporting pin 77 adapted to extend through any pair of openings 76. At either end of pin 77 is provided a stop 78 which may assume a position transverse to the shank of the pin and prevent the pin from slipping endwise out of the openings. Thus the spacing between the stacked pallets may be varied, when desired, an amount dependent on the number of spaced openings in the sleeve.

In the form of supporting device shown in Figs. 1–5, the rack members 20 are disengageable from the seating brackets; however, if desired the rack members may be permanently connected with the seating brackets.

In Figs. 6, 7, 8, 9, 10 and 11, are shown modified forms of seating brackets 40, 41, 80, 81, 82 and 83 respectively.

Bracket 40 comprises a substantially U-shaped clip member 42, and a pair of gripping members 43 and 44 extending outwardly beyond the forward edges of flange portions 45 and 46, respectively, of clip member 42. Portions of flanges 45 and 46 adjacent the web portion 47 of member 42 are offset toward each other and form shoulders 48 and 50. Thus, when the bracket 42 is positioned on the pallet, the web portion 47 is spaced from the edge of the pallet by reason of the shoulders. Formed on the portion 51 of flange 45, intermediate shoulder 48 and web 47 is an opening 52, through which extends the end of the corresponding leg 21 of the rack member 20. The portion 53 of flange 46, intermediate shoulder 50 and web 47, is provided with a centering mound or lug 54 which projects into the end of leg 21 of rack member 20.

The gripping members 43 and 44 are secured to the inside or adjacent surfaces of flange portions 45 and 46. The outer edge portions 55 and 56 of members 43 and 44, respectively, are turned inwardly toward each other to form lips 57 and 58. The lips 57 and 58 engage the inside surfaces 34 and 35, respectively, of the adjacent slats 30 and 31 and thus prevent slipping of the bracket in an endwise direction relative the end piece 12.

Bracket 41, as shown in Fig. 7, comprises a U-shaped clip member 60 and a pair of stops 61 mounted on the inside surfaces 62 and 63 of flange portions 64 and 65, respectively, of member 60. The web portion 66 of clip member 60 is spaced from the adjacent edge of the pallet when the bracket 41 is operatively positioned thereon by reason of stops 61. The forward edges of flange portions 64 and 65 are turned inwardly toward each other, as above described for bracket 40, to form lips 67 and 68 respectively. The lips 67 and 68 engage the inside edges 34 and 35, respectively, of slats 30 and 31 when the bracket is positioned on the pallet, and prevent slipping of the bracket in an endwise direction relative the end piece 12. The portions 70 and 71 of flanges 64 and 65, respectively, intermediate stops 61, and web 66 provide the socket or seating means for the leg 21 of the rack member 20. Portion 70 is provided with an opening 72 through which the leg 21 extends. Portion 71 is provided with a centering mound or lug 73 over which the leg 21 is positioned.

Bracket 80, shown in Fig. 8, embraces the closed end of the pallet 10, and comprises a substantially U-shaped supporting strap 84, having the web portion 85 thereof engaging the topside 14 of said pallet and the flange portions 86 of the strap engaging the corresponding ends of the end piece 12. Longitudinally mounted on either flange portion 86 is a socket 87 whose construction is similar to that of socket 24 above described. The flange portions 86 are prevented from spreading, when the bracket is under load, by a brace bar 88 extending the length of the strap and secured at either end to the side of the corresponding flange portion by welding or any other suitable means. The bar 88 also serves as a stop to prevent the strap 84 from moving too far inwardly from the end of the pallet. It is to be noted in this form of bracket that no part of the bracket engages or embraces the underside 15 of the pallet. Thus the operator may readily mount the bracket on, or remove it from the pallet, when the underside of the pallet is resting flush on the floor or any other flat surface.

Bracket 81, shown in Fig. 9, is similar to bracket 80, above described, except that a supporting loop 90 has replaced strap 84 and brace bar 88. The loop 90 completely embraces the end of the pallet. A pair of lugs 91 are provided at either end of the loop and serve as stops to prevent the loop from sliding too far inwardly from the end of the pallet.

Bracket 82, as shown in Fig. 10, is likewise similar to bracket 80 except that the web portion 85 of the strap 84 is provided with a spliced section 92 which allows the length of the web portion to be varied. An enlarged view of the spliced section 92 is shown in Fig. 12. A tongue 93 having the opposite edges thereof grooved or serrated is formed in portion 84a of the strap. A corresponding slot 94 is formed in portion 84b of the strap to receive the tongue 93. The opposite sides of the slot 94 are likewise grooved or serrated to mesh with the sides of the tongue. To lengthen the web portion 85, the tongue is not fully seated in the slot 94. The brace bar 88 for bracket 80 has been replaced in bracket 82 by a pair of plates 95, one welded at either end of the strap at the joint between the flange portion 86 and the web portion. The plates retain the relative positions of the flange portions with respect to the web portion when the bracket is under load. The plates also serve as stops to prevent sliding inwardly of the strap from the end of the pallet.

In Fig. 11, a bracket 83 is shown wherein the plates 95 above mentioned for bracket 82 have been replaced by a bar 96 positioned diagonally across the right angle formed by the flange portion and the web portion, and welded at either end to the flange and web portions.

In Figs. 13 through 15 is shown an attachment for the rack member 20, which may be employed when the pallet 10 is used for storing a multitude of small items or objects, such as pipe fittings and the like, thereon. The pallet is converted into a boxlike container or bin having walls or sides 97 extending vertically from the topside 14 of the pallet. Over the topside of the pallet is laid a metallic or wooden sheet, not shown, which is of suitable dimensions to fit between the walls 97 and thus prevents the objects from dropping through the spaces formed between the slats 13. The walls 97 are held in place by holding brackets 98. In the construction disclosed, the brackets 98 are of substantially T-shape cross section. One end of the cross piece 100 of the bracket is provided with an opening 101 through which a bolt 102 extends and holds the cross piece against the leg 21 of the rack member 20. The other end of the cross piece 100 is provided with a plurality of openings 103, through which nails or screws 104 extend and penetrate the adjacent surface of the wall 97a. The stem portion 105 of the bracket 98 tangentially engages the adjacent surface of leg 21. Thus the leg 21 tangentially engages the cross piece 100 and the stem portion 105 of the bracket 98. Wall 97b lies flush with the adjacent surface of the stem portion 105 and the end thereof abuts the cross piece 100. After wall 97b is positioned in place the wall 97a is positioned so that its outside surface lies flush with the inside surface of cross piece 100 and the end thereof abuts the inside surface of wall 97b, as shown in Figs. 13 and 14. The wall 97a is then secured to the corresponding end portion of cross piece 100 as heretofore mentioned.

Thus, it will be seen that an auxiliary supporting device has been provided for use in conjunction with a plurality of loaded pallets which enables said pallets to be stacked one above the other without resulting injury or damage to the loaded material. It will also be seen that a supporting device has been provided which merely clips on the edge of the pallet and may be readily removed therefrom when desired. Also, an attachment for the supporting device has been provided which enables the pallet to be converted into a boxlike container or bin.

While several embodiments of this invention are shown above, it will be understood, of course, that the invention is not to be limited thereto, since many modifications may be made and it is contemplated, therefore, by the appended claims to cover any such modifications as fall within the true spirit and scope of this invention.

I claim:

1. A supporting device in combination with a plurality of storage pallets for holding said pallets in a stacked position one spaced above the other, comprising a plurality of seating brackets detachably mounted on one of said pallets and arranged symmetrically about the peripheral edge of said one pallet, each of said brackets having a section thereof extending laterally from the peripheral edge of said one pallet and disposed outside the area delimited by said peripheral edge, and a pair of vertically-extending rack members mounted on said laterally extending bracket sections, each of said rack members having an offset ledge portion disposed within said delimited area for contacting the underside of a second pallet positioned thereabove.

2. A supporting device for maintaining a plurality of storage pallets in superposed relation, comprising a plurality of pallet-engaging seating brackets detachably mountable on one of said pallets, and a plurality of rack members mounted in upright relation on said brackets and being provided with a supporting ledge portion for engaging a second pallet positioned thereabove; each of said brackets comprising an elongated strap for detachably embracing the portion of the one pallet adjacent one peripheral side thereof, said strap including a center section having the length thereof adjustable to coincide substantially to the adjacent pallet side, and end sections angularly offset with respect to the center section and disposed outside the area delimited by the peripheral sides of the embraced pallet, a socket member mounted in upright position on each of said end sections for accommodating a portion of said rack members, and means cooperating with said end sections for effecting retention of said end sections in a fixed angularity with respect to said center section.

3. A supporting device in combination with a plurality of storage pallets for holding said pallets in a stacked position one spaced above the other, comprising a plurality of seating brackets detachably mounted on one of said pallets and disposed in spaced relation about the peripheral edge thereof, each of said brackets having a first section extending laterally from the peripheral edge of said one pallet and disposed outside the load-bearing area delimited by said peripheral edge, a second section extending angularly from said first section for resting upon a portion of said delimited load-bearing area, and a third section extending angularly from said second section for limiting the movement of said bracket in one direction relative to said one pallet, and a plurality of vertically-extending rack members mounted on and extending upwardly from said bracket first sections, each of said rack members having an offset ledge portion disposed within and spaced above said delimited area for contacting the underside of a second pallet positioned thereabove.

4. A supporting device in combination with a plurality of storage pallets for holding said pallets in a stacked position one spaced above the other, comprising a plurality of seating brackets detachably mounted on one of said pallets and disposed in spaced relation about the peripheral edge thereof, each of said brackets having a first section extending laterally from the peripheral edge of said one pallet and disposed outside the load-bearing area delimited by said peripheral edge, a second section extending angularly from said first section for resting upon a portion of said delimited area adjacent said peripheral edge, and a third section extending angularly from said second section and spaced from said first section and cooperating with said first section for locking said bracket against movement in two directions relative to said one pallet, and a plurality of vertically-extending rack members mounted on and extending upwardly from said bracket first sections, each of said rack members having an offset ledge portion disposed within and spaced above said delimited area for contacting the underside of a second pallet positioned thereabove.

5. A supporting device in combination with a plurality of storage pallets for holding said pallets in a stacked position one spaced above the other, comprising a plurality of seating brackets detachably mounted on one of said pallets and disposed in spaced relation about the peripheral edge thereof, each of said brackets having a first section extending laterally from the peripheral edge of said one pallet and disposed outside the load-bearing area delimited by said peripheral edge, a second section extending angularly from said first section and contacting portions of the load-bearing area and underside of said one pallet, a third section extending angularly from said second section and spaced from said first section for locking said bracket against lateral movement in one direction relative to said one pallet, and a fourth section interconnecting said first and second sections and disposed outside of said delimited area for contacting the peripheral edge of said one pallet and locking said bracket against lateral movement in a second direction relative to said one pallet, and a rack member detachably mounted on the first sections of said brackets and extending upwardly therefrom, said rack member having an offset portion disposed within and spaced above said delimited area for contacting the underside of a second pallet positioned thereabove.

References Cited in the file of this patent

UNITED STATES PATENTS

| Number | Name | Date |
|--------|------|------|
| 564,740 | Dietz | July 28, 1896 |
| 1,372,205 | Smith | Mar. 22, 1921 |
| 1,490,665 | Gifford | Apr. 15, 1924 |
| 1,527,174 | Davidson | Feb. 24, 1925 |
| 1,944,845 | Rickwood | Jan. 23, 1934 |
| 2,322,748 | Shaw et al. | June 29, 1943 |
| 2,395,982 | White | Mar. 5, 1946 |
| 2,495,711 | Fletcher | Jan. 31, 1950 |
| 2,497,453 | Hazen | Feb. 14, 1950 |
| 2,498,414 | Gondar | Feb. 21, 1950 |